(12) United States Patent
Ristock et al.

(10) Patent No.: US 10,447,859 B2
(45) Date of Patent: *Oct. 15, 2019

(54) SYSTEM AND METHOD FOR EXPOSING CUSTOMER AVAILABILITY TO CONTACT CENTER AGENTS

(71) Applicant: GENESYS TELECOMMUNICATIONS LABORATORIES, INC., Daly City, CA (US)

(72) Inventors: Herbert Willi Artur Ristock, Walnut Creek, CA (US); Vladimir Mezhibovsky, San Francisco, CA (US); Nikolay Korolev, Concord, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/968,632

(22) Filed: May 1, 2018

(65) Prior Publication Data

US 2018/0249011 A1 Aug. 30, 2018

Related U.S. Application Data

(63) Continuation of application No. 14/633,064, filed on Feb. 26, 2015, now Pat. No. 9,979,825, which is a continuation of application No. 13/668,048, filed on Nov. 2, 2012, now Pat. No. 8,995,644.

(51) Int. Cl.
*H04M 3/00* (2006.01)
*H04M 5/00* (2006.01)
*H04M 3/523* (2006.01)
*H04M 3/51* (2006.01)

(52) U.S. Cl.
CPC ....... *H04M 3/5232* (2013.01); *H04M 3/5141* (2013.01); *H04M 3/5231* (2013.01)

(58) Field of Classification Search
CPC .. H04M 3/5191; H04M 3/523; H04M 3/5231; H04M 3/42195
USPC ............. 379/265.02, 265.05, 265.09, 265.13
See application file for complete search history.

(56) References Cited

U.S. PATENT DOCUMENTS

| | | | |
|---|---|---|---|
| 6,115,737 A | 9/2000 | Ely et al. | |
| 7,573,996 B1 * | 8/2009 | Somani | ................... 379/210.01 |
| 7,936,867 B1 * | 5/2011 | Hill | ..................... H04M 3/5233 |
| | | | 379/265.09 |
| 7,949,121 B1 | 5/2011 | Flockhart et al. | |

(Continued)

FOREIGN PATENT DOCUMENTS

WO 2014071252 A1 5/2014

OTHER PUBLICATIONS

International Search Report and Written Opinion for Application No. PCT/US2013/068164, dated Jan. 29, 2014, 17 pages.

*Primary Examiner* — Nafiz E Hoque

(57) ABSTRACT

A system and method for establishing contact between a customer contact center agent and a customer based on customer availability information. A plurality of communication channels that may be used to communicate with the customer is monitored by the contact center. The availability of the customer is identified for each of the plurality of communication channels and user availability data is dynamically adjusted for each of the plurality of communication channels. The user availability data is provided to a contact center agent handling, for example, an offline task involving the customer. The contact center agent may use the availability data to establish contact with the customer to better handle the offline task.

22 Claims, 7 Drawing Sheets

(56) References Cited

U.S. PATENT DOCUMENTS

| | | |
|---|---|---|
| 8,275,365 B1 | 9/2012 | Patvarczki et al. |
| 2002/0025819 A1 | 2/2002 | Cetusic et al. |
| 2007/0015495 A1 | 1/2007 | Winter et al. |
| 2009/0305632 A1 | 12/2009 | Sarkissian et al. |
| 2010/0274637 A1 | 10/2010 | Li et al. |
| 2011/0091030 A1* | 4/2011 | Bhat et al. ............... 379/265.09 |
| 2011/0116617 A1 | 5/2011 | Fan et al. |
| 2012/0278115 A1* | 11/2012 | Acharya et al. ............. 705/7.13 |
| 2014/0126713 A1 | 5/2014 | Ristock et al. |

\* cited by examiner

SYSTEM AND METHOD FOR EXPOSING CUSTOMER AVAILABILITY TO CONTACT CENTER AGENTS

CROSS-REFERENCE TO RELATED APPLICATIONS

This application is a continuation of U.S. patent application Ser. No. 14/633,064, filed on Feb. 26, 2015, which is a continuation of U.S. patent application Ser. No. 13/668,048, filed on Nov. 2, 2012, now U.S. Pat. No. 8,995,644, the content of all of which are incorporated herein by reference.

FIELD

Embodiments of the present invention relate generally to systems and methods for operating customer contact centers, and more particularly, to a system and method for obtaining and providing customer availability information to contact center agents.

BACKGROUND

Businesses often use customer contact centers that include agents of the corresponding business to process transactions and/or service the needs of their customers. Contact centers may also proactively contact potential and/or existing customers for offering products, conducting surveys, or rendering other services to those customers. Traditional ways for customers and agents to communicate with one another is by telephone, fax, and/or email. However, recent trends in social networking, multimedia, and the Internet generally, have increased the variety of communication channels available for establishing contact between customers and agents. The extended channels of communication may be used for businesses to stay more connected with their customers.

In traditional contact centers, representatives of the business, or agents, are assigned to various customer tasks. Customer requests for live operator assistance, or real time assisted services, are commonly routed in "push mode" to the most appropriate agents serving as operators of the contact center. In "push mode," the records regarding the customer and/or information relating to the call are "pushed" to one or more agents. The routing system of the contact center may analyze agents' status information, which may indicate whether a particular agent is busy with a given customer task (or with some other activity such as training), and which medium the agent is using in connection with that task. For work done by agents offline, which may be referred to as back office work, there is generally no visibility regarding the particular task the agent is handling for the customer. Furthermore, customer presence information (e.g., information indicating whether a customer is on hold in a queue) is also not generally visible to the agents. Having information about customer availability may be useful for agents conducting offline tasks if the agents want to contact the customers to whom the tasks relate.

In some instances, an agent engaged in an offline task may attempt to contact a customer by directly calling the customer's phone(s). However, attempting to connect with the customer in this manner may be inconvenient, intrusive, and/or impractical. For example, there may be multiple contact numbers on record for the customer, some of which may no longer be up-to-date. Furthermore, the availability of the customer prior to the attempted contact may be unknown to the agent. Accordingly, the success rate of achieving contact with the customer may be low, which may result in reluctance on the part of the agent to try to contact the customer in this manner again.

Accordingly, what is desired is a system and method for providing to agents engaged in offline tasks ability to access and assess customer availability quickly and reliably for allowing such tasks to be more quickly resolved.

SUMMARY

Embodiments of the present invention are directed to a system and method for establishing contact between a customer contact center agent and an end user. A plurality of communication channels are monitored by one or more processors. Availability of the end user on each of the plurality of communication channels is identified, and user availability data is dynamically adjusted for each of the plurality of communication channels. The user availability data is provided to a contact center agent. Contact between the contact center agent and the end user is established via one of the plurality of communication channels for which the end user is identified as being available.

According to one embodiment, one of the plurality of communication channels is with a mobile phone, and the monitoring includes monitoring an application installed on the mobile phone. According to this embodiment, the application may be configured to monitor user actions via the mobile phone and provide the user availability data based on the monitored user actions.

The plurality of communication channels may also be a telephony channel, social media website, or a chat channel.

According to one embodiment, one of the plurality of communication channels is with a web browser, and the monitoring includes monitoring a website for interactions with the end user.

According to one embodiment, the user availability data indicates that the end user is unavailable for being contacted via the corresponding communication channel.

According to one embodiment, the user availability data indicates that the end user is passively available for being contacted via the corresponding communication channel.

According to one embodiment, a request is transmitted to the end user over the one of the plurality of communication channels, and the establishing the contact between the contact center agent device and the end user is based on acceptance of the request by the end user.

According to one embodiment, the user availability data is displayed in association with an activity to be completed by the contact center agent.

According to one embodiment, in response to establishing the contact between the contact center agent and the end user, the user availability data is modified for the communication channel used to establish the contact.

These and other features and aspects of embodiments of the present invention will be more fully understood when considered with respect to the following detailed description, appended claims, and accompanying drawings. Of course, the actual scope of the invention is defined by the appended claims, and their equivalents.

DETAILED DESCRIPTION

In general terms, embodiments of the present invention are directed to a customer service center, or a business contact center, that operates by exposing customer presence information to agents of a contact center.

According to one exemplary embodiment, agents are assigned a certain number of offline tasks such as, for example, emails, letters, internally generated tasks, and the like, by placing such tasks in the agents' workbins. Agents who are not online with a customer (e.g. via a voice connection) may choose a next offline task for processing from the workbin. Certain tasks, however, are more complex than others and may require clarification from the given customer.

According to one exemplary embodiment, agents have access to information on a customer's availability to engage in a live conversation with an agent in order to respond, among other things, questions that the agent may have while handling a task associated with the customer. The live conversation may be conducted, for example, via any known real time media channel such as, for example, chat, text, voice, social media, and the like. If the customer is identified as being available for a particular type of live conversation, the agent may decide to engage the customer via the appropriate media channel and use the opportunity to clarify issues interactively using the selected media channel.

According to one exemplary embodiment of the invention, one or more servers within the contact center monitor customer presence/availability information on various real time interaction channels and dynamically adjust the customer availability data for each of the channels. The customer availability data is then provided to one or more agents. The customer presence information may also be statically configured. For example, a customer may provide availability timeslots and this information may be stored in the customer's profile record. Such information may be captured, for example, from scheduled callbacks, from a previous live conversation, or the like.

Figure 1:
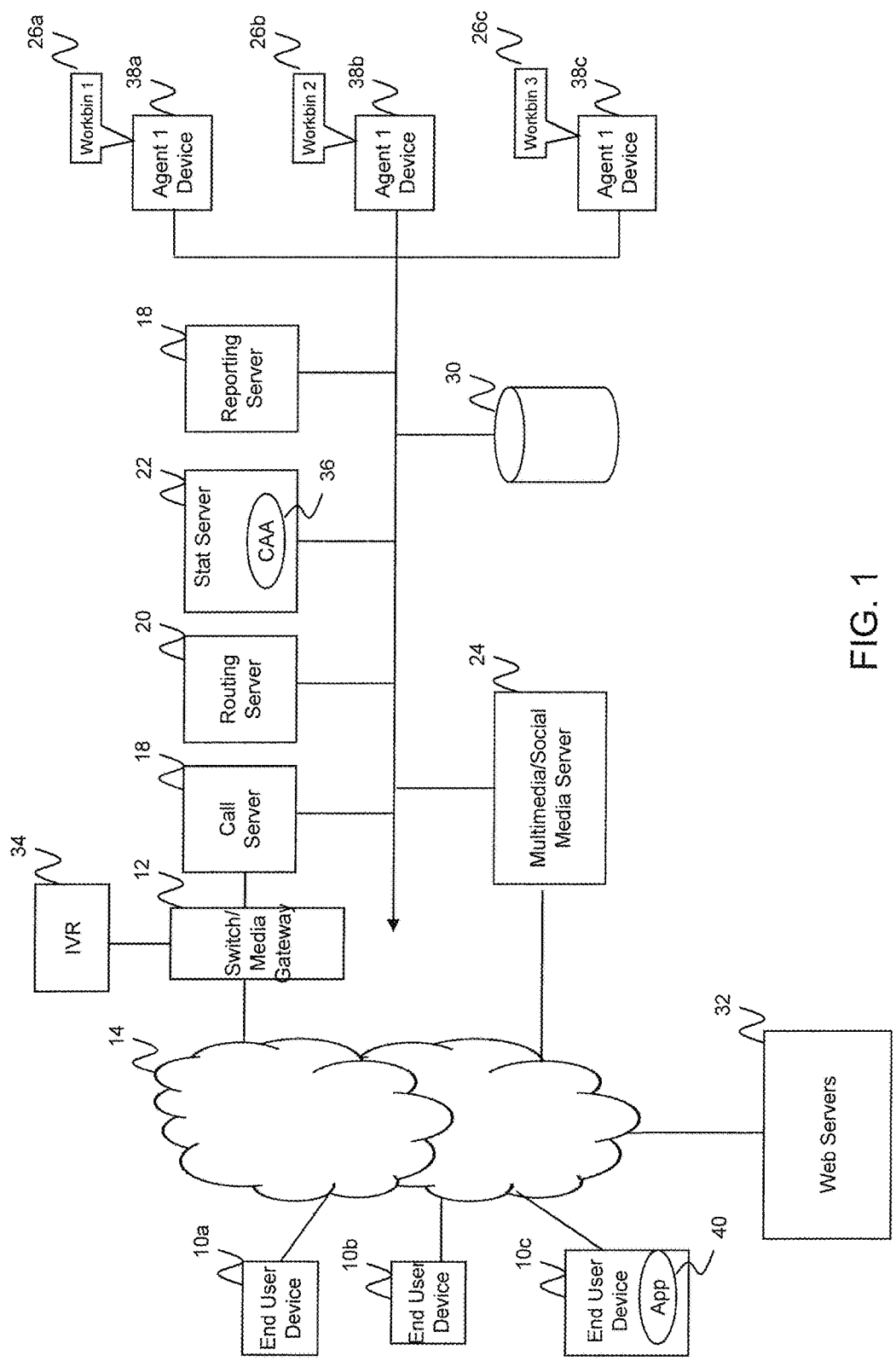
FIG. 1 is a schematic block diagram of a system supporting a contact center configured to provide customer availability information to customer service agents according to one exemplary embodiment of the invention.

FIG. 1 is a schematic block diagram of a system supporting a contact center that is configured to provide customer availability information to customer service agents according to one exemplary embodiment of the invention. The contact center may be an in-house facility to a business or corporation for serving the enterprise in performing the functions of sales and service relative to the products and services available through the enterprise. In another aspect, the contact center may be a third-party service provider. The contact center may be hosted in equipment dedicated to the enterprise or third-party service provider, and/or hosted in a remote computing environment such as, for example, a private or public cloud environment with infrastructure for supporting multiple contact centers for multiple enterprises.

According to one exemplary embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers) desiring to receive services from the contact center may initiate inbound calls to the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like.

Inbound and outbound calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one exemplary embodiment, the contact center includes a switch/media gateway 12 coupled to the communications network 14 for receiving and transmitting calls between end users and the contact center. The switch/media gateway 12 may include a telephony switch configured to function as a central switch for agent level routing within the center. In this regard, the switch/media gateway 12 may include an automatic call distributor, a private branch exchange (PBX), an IP-based software switch, and/or any other switch or media gateway configured to receive Internet-sourced calls and/or telephone network-sourced calls. According to one exemplary embodiment of the invention, the switch/media gateway is coupled to a call server 18 which may, for example, serve as an adapter or interface between the switch/media gateway and the remainder of the routing, monitoring, and other call-handling systems of the contact center.

The contact center may also include a multimedia/social media server for engaging in media interactions (other than telephony calls) with the end user devices 10 and/or web servers 32. The media interactions may be related, for example, to email, chat, text-messaging, web, social media, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, the switch/media gateway is coupled to an interactive voice response (IVR) server 34. The IVR server 34 is configured, for example, with an IVR script for querying customers on their needs. For example, a contact center for a bank may tell callers, via the IVR script, to "press 1" if they wish to get an account balance. If this is the case, through continued interaction with the IVR, customers may complete service without needing to speak with an agent.

If the call is to be routed to an agent, the call is forwarded to the call server 18 which interacts with a routing server 20 for finding the most appropriate agent for processing the call. The call server 18 may be configured to process PSTN calls, VoIP calls, and the like. For example, the call server 18 may include a session initiation protocol (SIP) server for processing SIP calls.

In one example, while an agent is being located and until such agent becomes available, the call server may place the call in a call queue. The call queue may be implemented via any data structure conventional in the art, such as, for example, a linked list, array, and/or the like. The data structure may be maintained, for example, in buffer memory provided by the call server 18.

Once an appropriate agent is available to handle a call, the call is removed from the call queue and transferred to the corresponding agent device 38a-38c (collectively referenced as 38). Collected information about the caller and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center and performing data processing associated with contact center operations.

The selection of an appropriate agent for routing an inbound call may be based, for example, on a routing strategy employed by the routing server 20, and further based on information about agent availability, skills, and other routing parameters provided, for example, by a statistics server 22. According to one exemplary embodiment of the invention, the statistics server 22 includes a customer availability aggregation (CAA) module 36 for monitoring availability of end users on different communication channels and providing such information to, for example, the routing server 20, agent devices 38a-38c, and/or other contact center applications and devices. The CAA module may also be deployed in a separate application server. The aggregation module 36 may be a software module implemented via computer program instructions which are stored in memory of the statistics server 22 (or some other server), and which program instructions are executed by a processor. A person of skill in the art should recognize that the aggregation module 36 may also be implemented via firmware (e.g. an application-specific integrated circuit), hardware, or a combination of software, firmware, and hardware.

According to one exemplary embodiment, the aggregation module 36 is configured to receive customer availability information from other devices in the contact center, such as, for example, the multimedia/social media server 24. For example, the multimedia/social media server 24 may be configured to detect user presence on different websites including social media sites, and provide such information to the aggregation module 36. The web monitoring server 26 may also be configured to monitor and track interactions on those websites.

The multimedia/social media server 24 may also be configured to provide, to an end user, a mobile application 40 for downloading onto the end user device 10. The mobile application 40 may provide user configurable settings that indicate, for example, whether the user is available, not available, or availability is unknown, for purposes of being contacted by a contact center agent. The multimedia/social media server 24 may monitor the status settings and send updates to the aggregation module each time the status information changes.

The contact center may also include a reporting server 28 configured to generate reports from data aggregated by the statistics server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

According to one exemplary embodiment of the invention, the routing server 20 is enhanced with functionality for managing back-office/offline activities that are assigned to the agents. Such activities may include, for example, responding to emails, responding to letters, attending training seminars, or any other activity that does not entail real time communication with a customer. Once assigned to an agent, an activity may appear in the agent's workbin 26a-26c (collectively referenced as 26) as a task to be completed by the agent. The agent's workbin may be implemented via any data structure conventional in the art, such as, for example, a linked list, array, and/or the like. The workbin may be maintained, for example, in buffer memory in each agent's computer device.

According to one exemplary embodiment of the invention, the contact center also includes a mass storage device 30 for storing data related to contact center operations such as, for example, information related to agents, customers, customer interactions, and the like. The mass storage device may take form of a hard disk or disk array as is conventional in the art.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

Figure 2:
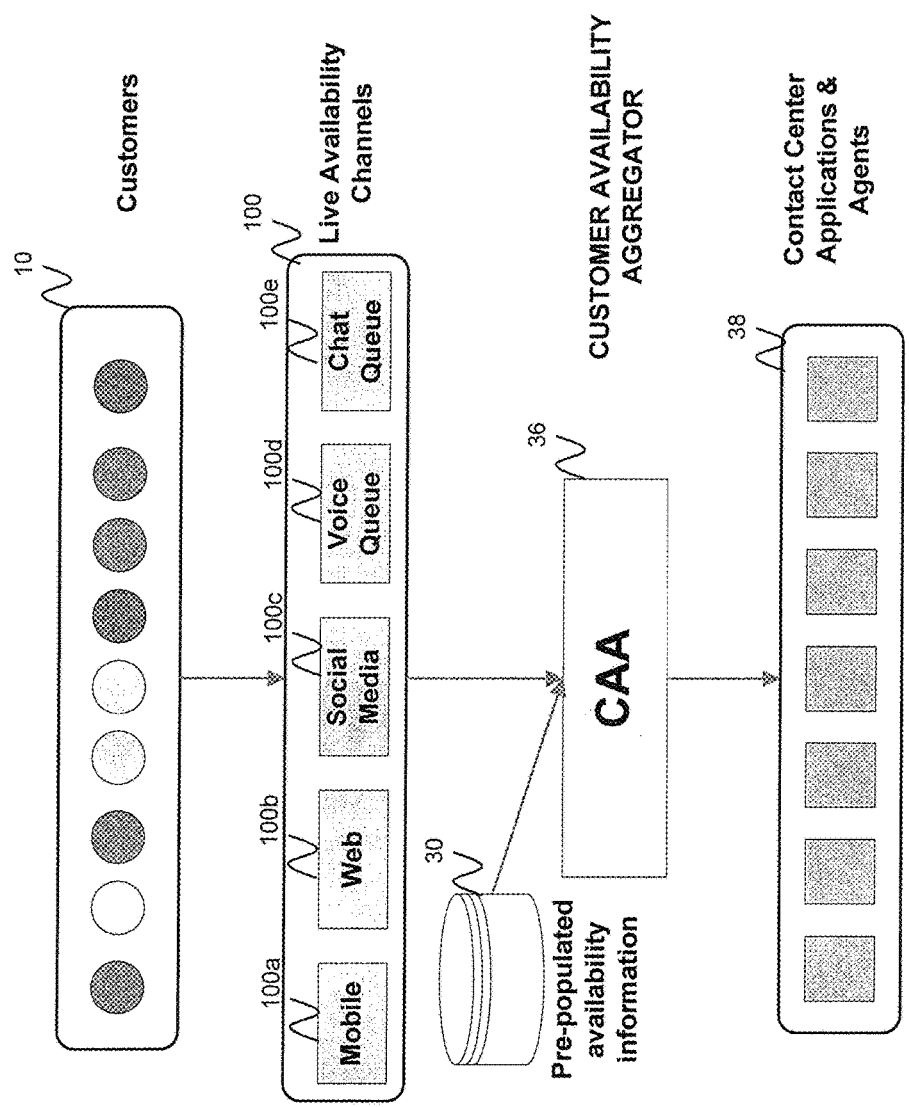
FIG. 2 is a semi-schematic block diagram of various communication channels that may be monitored by an aggregation module for detecting customer presence according to one exemplary embodiment of the invention.

FIG. 2 is a semi-schematic block diagram of various communication channels 100 that may be monitored by the aggregation module 36 for detecting customer presence according to one exemplary embodiment of the invention. The various communication channels 100 that may be monitored include, without limitation, communication channels associated with mobile phones (mobile phone channels) 100a, web browser based channels (web channels) 100b, social media channels 100c, voice channels 100d, chat channels 100e, and other real time media channels conventional in the art. The customers may be present on one or more of the various communication channels for various reasons. The reason for being present on a particular communication channel may or may not relate to the enterprise represented by the contact center or its products or services.

According to one exemplary embodiment, customers use the end user devices 10 to establish presence on the various communication channels 100. The aggregation module 36 directly or indirectly monitors the various communication channels 100, determines the state of the end users on the communication channels, and dynamically adjusts customer availability data based on the determined state. The state of the end users may also be determined based on pre-populated availability information stored in the mass storage device 30. For example, pre-populated availability information may be stored in each customer's profile record. For example, if the user has requested a call back to resolve a particular issue at a particular date and/or time, such information may be stored in the user's profile record. The records may also indicate the customer's preferred mode of contact (e.g. via mobile phone during the weekdays, but email on the weekends). The records may also indicate subject matters for which contact may be desired, and the mode of contact. For example, the records may dictate that simple billing issues are to be handled only via email, or via the customer's compatible accounting software, while changes to the customer's account information are to be handled via live contact.

A particular customer's availability state may be maintained, for example, in one or more state transition tables. For example, a separate state transition table may be maintained per customer, per communication channel, in a buffer maintained by the statistics server 22. The availability information may then be provided to a requesting application, agent via the agent device 38, and/or the like.

According to one exemplary embodiment, in monitoring the mobile phone channel 100a, the aggregation module 36 determines the setting of the mobile phone application 40 (FIG. 1) downloaded onto the mobile phone devices of the different customers. The mobile phone application may be an application dedicated to communication with the contact center, an application for accessing products and/or services of the associated enterprise, or the like. For example, a banking enterprise may provide an application for downloading onto the mobile phone device. The application may be invoked by the customer to access bank account information, conduct financial transactions, communicate with customer service agents, and the like.

According to one exemplary embodiment of the invention, the application 40 may provide user configurable settings for indicating the availability state of the customer for purposes of being contacted by a contact center agent. The customer may manually set his or her availability state, and/or the availability state may be set automatically in response to detection of certain actions by the customer. For example, the application 40 may be configured to monitor user interactions with the mobile device, such as, for example, initiating calls, terminating calls, and the like, and update a customer state based on such interactions. The application may be configured to transmit the customer state information to the multimedia/social media server 24 which in turn forwards the information to the aggregation module. Of course, the application may be configured to transmit the customer state information directly to the aggregation module 36.

According to one exemplary embodiment, if the application is installed on an end user device but disabled, the state of the associated customer is set to unknown. If the application is active but the setting is set to "blocked," the state of the customer for the mobile phone channel 100a is also set to "blocked." For example, the user may be actively using the application, but may have expressly set the setting to "blocked" to indicate that the user does not want to be contacted by an agent.

According to one exemplary embodiment, a user may set the setting of the application 40, and hence, the state of the user for the mobile phone channel 100a, to be "passive active" or "passive available." The "passive active" or "passive available" setting may also be automatically set upon activating the application. In a "passive active" or "passive available" setting, the customer agrees that the contact center may alert the user that a live contact is desired as needed. The alert may be, for example, a text message requesting permission for the live contact. If however, the user responds to such a text message indicating the no such contact is desired, the users' state may transition to "blocked." According to one example, the user's state may remain in the "blocked" state for a particular time period or until another input is detected by the application which triggers transition to a different state.

According to one exemplary embodiment, the application 40 may provide an option for the user to launch an explicit request to get in contact with an agent. For example, the application may provide a button prompting the customer to press the button to either initiate a contact to an agent or get a callback from an agent. In the latter scenario, actuating the button may cause the user's mobile phone device to transmit a callback request to the multimedia/social media server 24 which then forwards the request to the call and/or routing server 18, 20 for identifying an agent to process the request. The application 40 may further update the user state to indicate that the user is actively waiting to be contacted, and forward the updated state for receipt by the aggregation module 36 for storing with respect to the mobile phone channel 100a. In lieu or in addition to a call, the contact and/or callback may utilize another form of media such as, for example, chat. In other embodiments, both the user and agent may negotiate a best time for establishing live contact, and then either party may initiate the session.

With respect to the web channel 100b, the web monitoring server 26 may monitor the user's actions on particular websites and forward the information to the aggregation module 36. In this regard, tracking codes may be embedded in each web page of a website that is monitored for visitor activity. The tracking code may be, for example, a JavaScript code, ActionScript code, or the like. The script may define the type of activities that are to be monitored including, without limitation, activities to access website features, navigation on the webpages and between webpages, search activities, interaction with product ads, electronic shopping activities, and the like. The state of the visitor to the website may be set based on the monitored interactions. For example, the state of the user may be set to "passive availability" while a user interacts with the monitored website. If in response to notification (e.g. a pop-up message) requesting permission to contact the customer, the user indicates that no such contact is desired (e.g. by selecting a "no thank you" option on the pop-up), the state of the user may transition to "blocked" for the current session on the website. According to another example, the state of the user may transition to "unknown" after a certain amount of time has elapsed without receiving interactions from the user's end device. The state may also transition to "actively waiting" upon detecting that the user has selected a "help" button, has entered a "help" search request, has selected a callback button, or the like.

With respect to the social media channel 100c, the web monitoring server 26 may monitor a user's activity on various social media websites (e.g. Facebook, Twitter, etc.) and forward the information to the aggregation module 36. Particular social media websites may expose a subscriber's activity information via an application programming interface (API). In this regard, the web monitoring server 26 interfaces with the APIs to obtain information about a particular user such as, for example, whether the user is logged in, types of transactions conducted by the user, the time of transactions, and the like. The web monitoring server 26 may forward this information to the aggregation module 36 for setting the user's state on the particular social web media channel. For example, if the user is logged in on a particular social media website, the aggregation module may automatically set the user's state information for that particular social media channel to be "passive available." If the user has blocked his login information from being exposed, via, for example, his privacy settings, the user's state information may be marked as being "unknown." The social media website, may also have a setting expressly set on the social media website which indicates that the user does not want to be contacted or is actively waiting to be contacted.

With respect to the voice and chat channels 100d, 100e, the call server 18 (or a separate chat server (not shown)) may monitor a call/voice queue and chat queue for determining whether the user is actively waiting in the queue for conversation with an agent. If so, the user's state for the voice or chat channel may be set to be "waiting." According to exemplary embodiments, the voice queue includes landline calls, Internet telephony calls, and the like.

Figure 3:
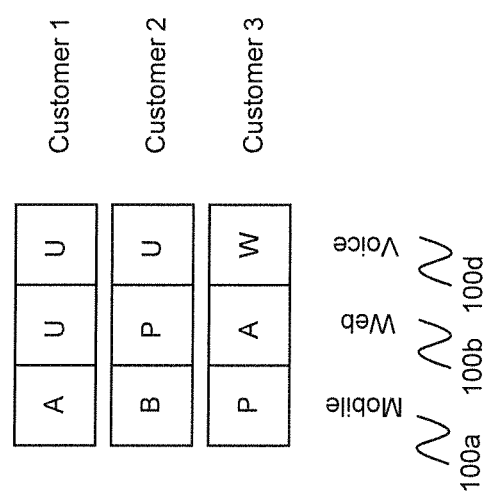
FIG. 3 is a semi-schematic layout diagram providing example customer availability states for various communication channels.

FIG. 3 is a semi-schematic layout diagram providing example customer availability states for various communication channels. The channels may be physical communication links, applications enabling particular modes of communication, or the like.

In one exemplary embodiment, the customer availability states may be set based on actively monitored availability information, or from a combination of actively monitored availability information and pre-populated availability information. According to one exemplary embodiment, the pre-populated availability information may trump a conflicting availability information provided by dynamically monitoring the various communication channels. According to another exemplary embodiment, the dynamically monitored state information may trump a conflicting pre-populated availability information.

In the example of FIG. 3, availability of three customers are provided with respect to the mobile phone channel 100a, web channel 100b, and voice channel 100e. As a person of skill in the art will recognize, embodiments of the present invention are not limited to the particular availability states or communication channels depicted in FIG. 3, and may encompass other availability states and/or communication channels which are well known in the art. Furthermore, embodiments of the present invention cover any conventional mechanism for depicting the particular availability states, such as for example, different colors, text, drawings, designs, and the like.

In the exemplary embodiment of FIG. 3, customer 1 is identified as "active available" via text, color, graphics, or any other visual and/or audio representation, indicating that the customer is actively waiting to be contacted over the mobile phone while his availability on the web and voice channels are indicated as being "unknown" (or absent). Customer 2 is identified as being "blocked" on the mobile phone (e.g. by setting the corresponding application on a "blocked" state), while his availability on the web is deemed to be "passive available." For example, customer 2 may be browsing products or services on a monitored website. Customer 2's availability on the voice channel is indicated as being "unknown."

Customer 3 is identified as being "passive available" on the mobile phone while "active available" on the web channel and "waiting" in a voice queue. For example, customer 3, while conducting a particular transaction on a monitored website, selects a button on the website to transmit a request for assistance. The actuation of such a button causes the aggregation module 36 to transition the user's state on the web to "active available." The customer 3, after or before actuating the help button, also places a call to the contact center and is placed on hold, causing the aggregation module to set the user's state for the voice channel as "waiting." Once the user is engaged in a conversation with an agent, the user's state for the voice channel may transition to "busy on call."

Figure 4A:
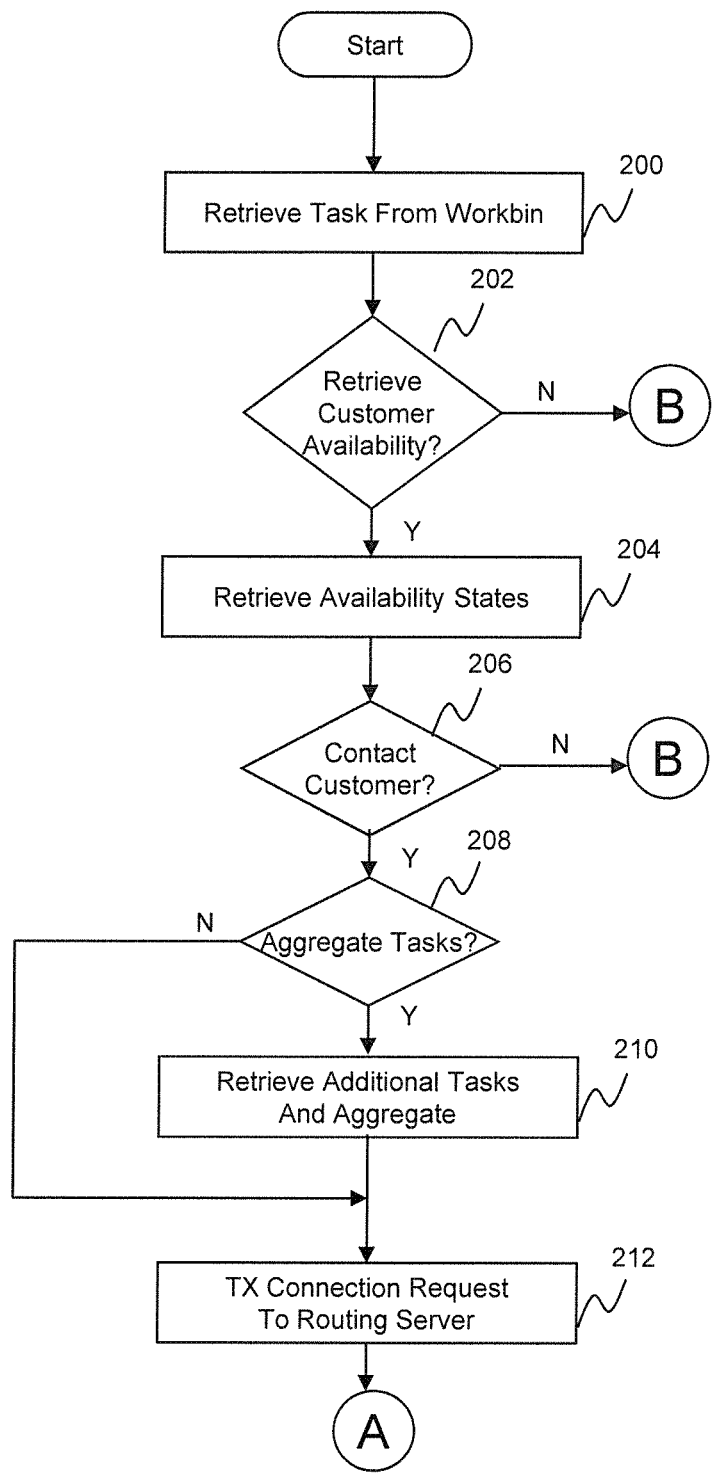
FIGS. 4A and 4B are flowcharts of a process for handling an offline task according to one exemplary embodiment of the present invention.
Figure 4B:
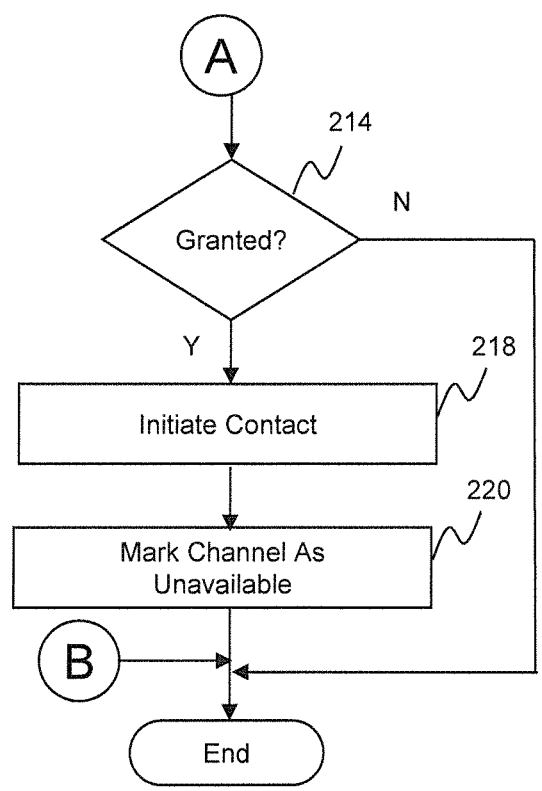

FIGS. 4A and 4B are flowcharts of a process for handling an offline task according to one exemplary embodiment of the present invention. The process may be described in terms of a software routine executed by one or more processors based on computer program instructions stored in memory. A person of skill in the art should recognize, however, that the routine may be executed via hardware, firmware (e.g. via an ASIC), or in combination of software, firmware, and/or hardware. Furthermore, the sequence of steps of the process is not fixed, but may be altered into any desired sequence as recognized by a person of skill in the art.

In step 200, an agent process executed by an agent device 38 retrieves an offline task from an agent workbin 26 in response to an agent command. The agent command may be provided via a user input device such as, for example, a keyboard and/or mouse. For example, the agent may use the user input device to select a particular task displayed on his or her monitor. The task may be associated with a task ID, customer information, task information, and the like. The task may be, for example, to respond to an email, letter, request for a callback, or the like.

In step 202, the agent process determines whether the customer's availability information is to be retrieved. For example, the agent may expressly request for such availability information via his or her user input device. In other embodiments, the agent process may be configured to automatically retrieve the availability status of each customer associated with a task in the agent's workbin. According to the latter scenario, the customer availability information may be shown for each individual interaction in the agent's workbin, and the agent may first pick those interactions with positive customer presence information. The availability information may be shown via text, graphics, color, or any other audio/visual representation conventional in the art.

If the availability status is to be retrieved, the request is forwarded to the aggregation module 36. The aggregation module, in step 204, retrieves and forwards to the requesting agent device the user's availability states for the various communication channels. The customer's availability information may be displayed, for example, next to the task associated with the customer.

According to one exemplary embodiment, one or more of the communication channels may be highlighted as being a preferred mode of contact based on one or more parameters. Such parameters may include, without limitation, the particular task to be performed, the customer's static availability information retrieved from the customer's profile record, the customer's expressly indicated contact preference, and the like. For example, if the dynamic availability information for a particular customer indicates "passive available"

for both the mobile phone channel and web channel, but the customer's preferred mode of contact for billing inquiries is via a call to the customer's cell phone, the aggregation module may highlight or otherwise mark the mobile phone channel as a preferred contact medium if the task is billing related.

In step 206, the agent process determines whether the agent has requested live contact with the customer via one of the channels on which the customer is identified as being available. The agent's decision to contact the customer may be driven by a variety of factors including, for example:

a) missing information from the customer that prevents the agent from completing the task;

b) urgency of feedback to the customer;

c) multiple tasks associated with the same customer which could be handled concurrently;

d) to avoid lengthy written explanations in a response back to the customer;

e) sensitivity of the matter that could be better discussed orally;

f) de-escalation of complaint by the customer.

If the agent has requested the live contact, the agent process determines, in step 208, whether there are one or more other open tasks associated with the customer for aggregating with the current task. If there are any additional open tasks associated with the customer, such tasks may be aggregated with the current task in step 210. Alternatively, the tasks are not aggregated. The aggregation of tasks may be done by one or more servers, such as, for example, by the routing server 20 or another scheduling server as will be understood by a person of skill in the art. In this manner, if the other tasks require clarification or live contact with the customer, the agent may resolve those issues during the contact for the current task. The aggregation of tasks may invoke reassignment of tasks from one agent to another. The reassignment may, according to one example, be just tentative, and depend on whether the agent to whom the tasks are aggregate is successful in making live contact with the customer.

Of course, the aggregation of tasks is optional, and the process may be configured to proceed without checking whether tasks are to be aggregated.

In step 212, the agent process transmits to the routing server 20 a request to contact the customer via the identified communication channel. The request may invoke an arbitration process if multiple agents have transmitted similar requests to contact the same customer, or if the customer is actively waiting in queue for being served by an agent. In the latter scenario, the requesting agent may be assigned to handle servicing of the call if deemed to have the right skills.

In step 214, the agent process determines whether the request has been granted. If the answer is YES, the routing server 20 invokes the call server 18 or another appropriate media server in step 218 to initiate the contact with the customer via the communication channel. For example, if the contact is via the mobile phone channel, the call server 18 is invoked for initiating an outbound call to the end user's mobile device. According to one exemplary embodiment, the agent may first request permission from the customer to be contacted via the identified communication channel. For example, the agent may first transmit a text to the mobile device requesting permission for the call. Once the customer confirms, the interaction may be initiated by either the agent or the customer. If the customer is not ready for the call, the agent and customer may negotiate a better time in which to engage in the call.

If the contact is via the web, the appropriate media server initiates a web chat session, Web real-time communication (WebRTC) call, or another browser-based communication between the customer and the agent. If the contact is via social media, the appropriate media server may identify the customer's social media account for allowing the agent to post comments, transmit private message, and the like. If, however, the contact is a voice call or chat session with a customer who is already waiting in a call or chat queue, the customer's call may be removed from the call or chat queue and forwarded to the agent's telephone and/or computer.

In step 220, the particular communication channel for which contact is invoked is marked as unavailable or "busy on call" by the aggregation server.

In some situations, although the customer presence information may indicate that the customer is available for a live interaction, the customer may for various reasons not respond to the request for the live interaction. For example, the customer may have temporarily stepped away from his end user device. According to one exemplary embodiment, the process determines whether a connection attempt was in fact successful, and if no connection is made with the customer over the selected communication channel, the channel is marked as unavailable, the agent is alerted of this fact, and the process ends. According to some exemplary embodiments, a certain number of attempts may be made to connect with the customer over the selected communication channel before deeming the communication channel as being unavailable. Of course, the agent may decide to re-initiate the contact over the same or different communication channel in the event of an unsuccessful connection.

Figure 5:
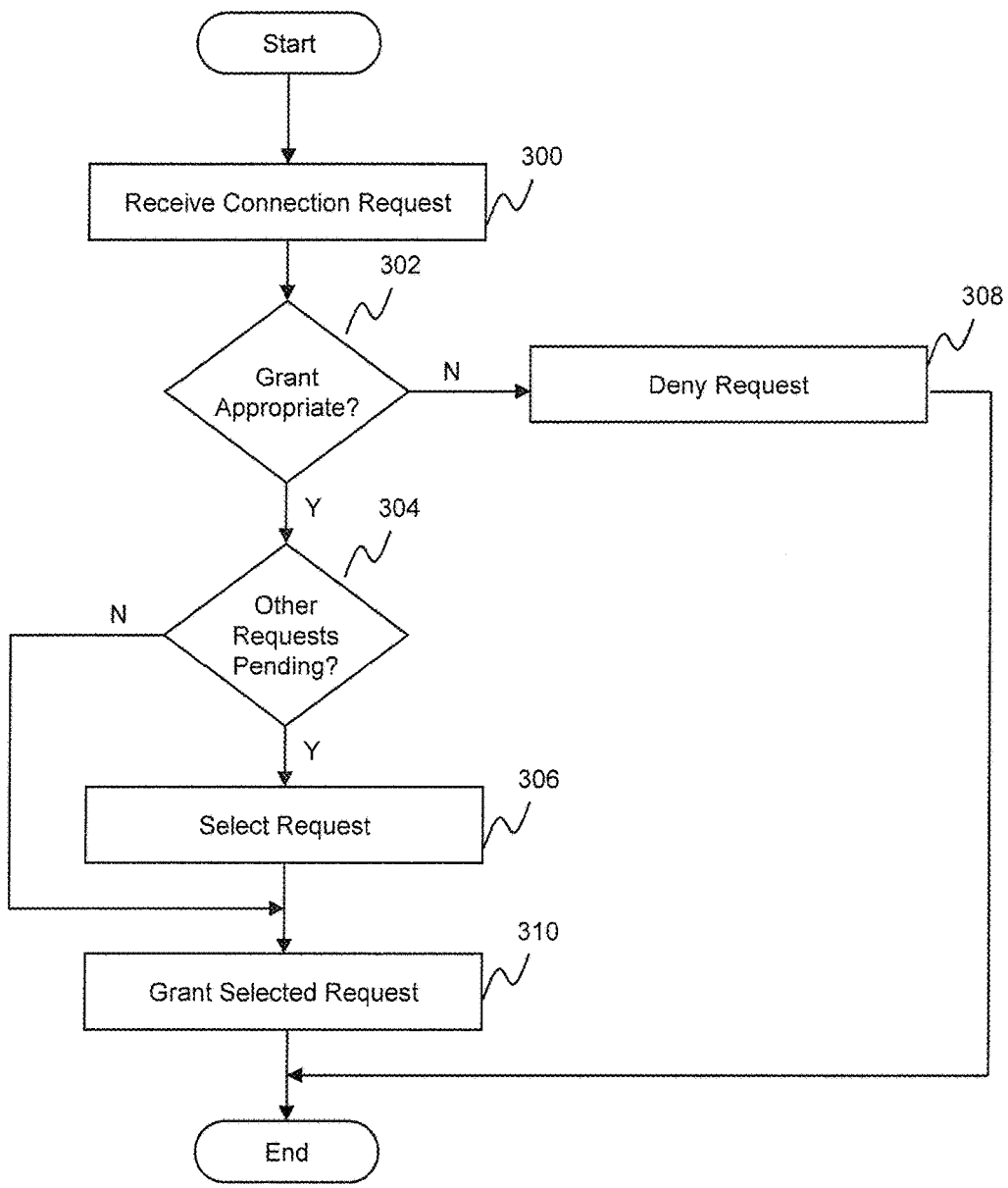
FIG. 5 is an arbitration process executed by a routing server for receiving and granting connection requests according to one embodiment of the invention.

FIG. 5 is an arbitration process executed by the routing server 20 for receiving (step 212 of FIG. 4A) and granting connection requests according to one embodiment of the invention. The arbitration process may be described in terms of a software routine executed by one or more processors in the routing server 20 based on computer program instructions stored in memory. A person of skill in the art should recognize, however, that the routine may be executed via hardware, firmware (e.g. via an ASIC), or in combination of software, firmware, and/or hardware. Furthermore, the sequence of steps of the process is not fixed, but may be altered into any desired sequence as recognized by a person of skill in the art.

The arbitration process starts, and in step 300, the routing server 20 receives a connection request from an agent device. The request may include, for example, identification of the requesting agent, identification of the customer to be contacted, identification of the communication channel requested for the contact, information on the task involved, and the like.

In step 302, the routing server determines whether it is appropriate to grant the connection to the requesting agent.

The routing server may consider various factors in granting or denying the connection, such as, for example:

a) importance of the task(s) associated with the connection request (the more important the task, the more likely the request is to be granted);

b) the customer's survey responses on previous similar contacts (the more favorable the survey response, the more likely the request is to be granted);

c) amount of time elapsed since the last live contact with the customer (too frequent contacts may want to be avoided); and d) scheduled/planned future contacts with the customer.

According to one example, if the weighing of different criteria results in a determination that the connection is to be denied, the routing server denies the request in step 308 and notifies the requesting agent of the denial. Otherwise, if the connection is to be granted, the routing server determines, in step 304, whether other agents have submitted requests to contact the customer via the same communication channel. In this regard, the routing server may be configured to collect requests for a particular collection period before determining to whom to grant the request. The collection period may be configurable as well as self-calibrating. This may help ensure fairness if certain agents have slower network connectivity.

If the answer is YES, the routing server engages in arbitration for selecting, in step 306, the agent to whom the request is to be granted. According to one exemplary embodiment, the selection of the agent based on requests collected during a present collection period may be random, based on a last granted request, or based on any other selection mechanism conventional in the art. In other exemplary embodiments, the selection may be based on importance of the tasks (assuming that the tasks were not aggregated) and other criteria as will be apparent to a person of skill in the art.

In step 310, the routing server grants the connection requested for the selected agent and denies other conflicting requests. According to one exemplary embodiment, the tasks of the agents that were denied the connection request may be assigned to the agent that was granted the request.

Figure 6:
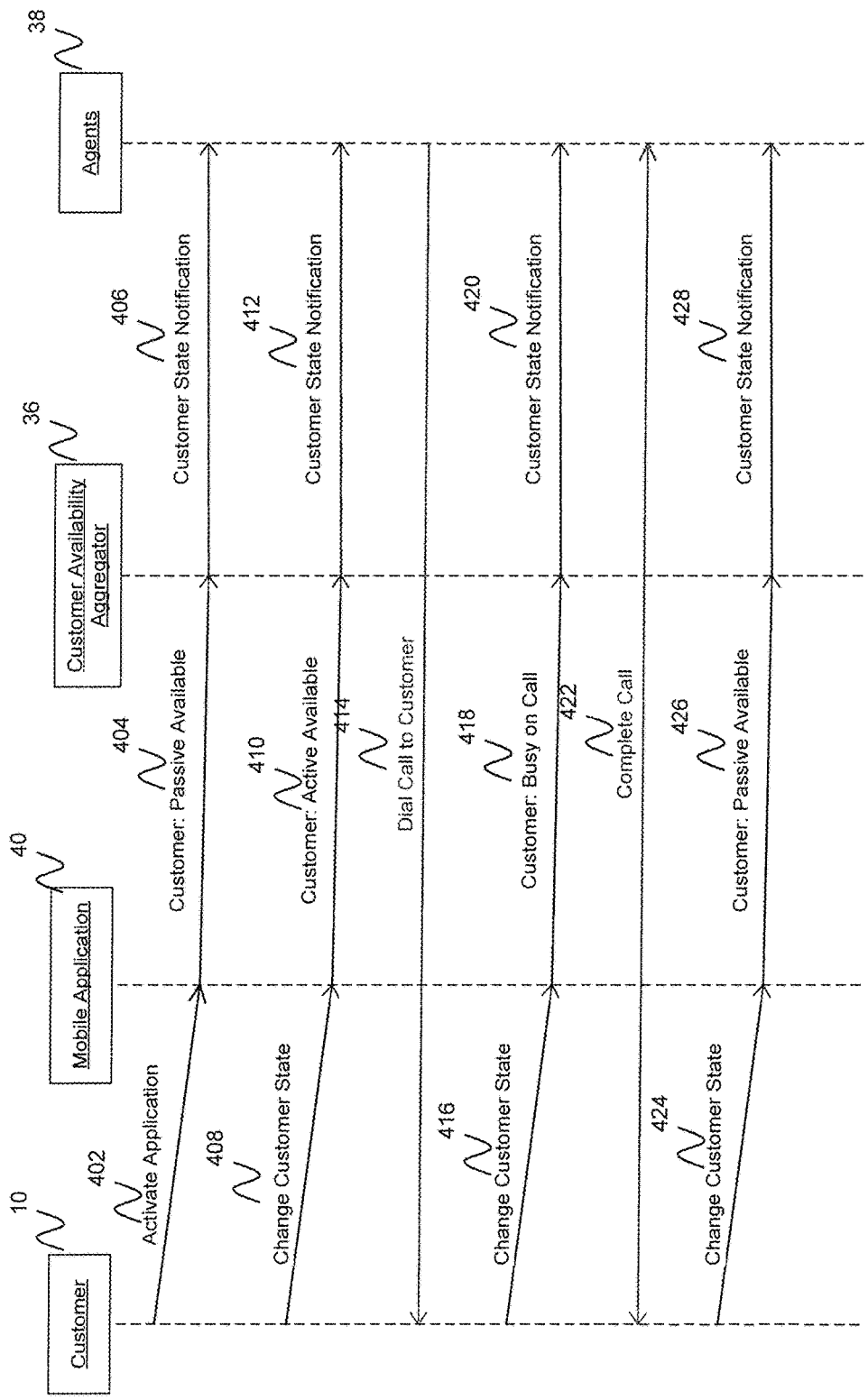
FIG. 6 is a sample event flow diagram for receiving and updating customer state information for a mobile phone channel according to one embodiment of the invention.

FIG. 6 is a sample event flow diagram for receiving and updating customer state information for a mobile phone channel according to one embodiment of the invention. In step 402, a customer invokes his end user device 10 to activate the mobile application 40 installed on the user's mobile phone device. The activating of the application causes the application to set the customer status as "passive available," and transmit the status information to the aggregation module 36 in step 404. The customer state information is stored, for example, in a state transition table maintained by the aggregation module 36 for the particular customer, for the mobile phone channel 100*a*.

In step 406, the customer state information is forwarded to one or more agent devices 38. For example, the state information may automatically be displayed next to a task that is pending for the customer. The customer state information may also be provided upon request from a particular agent.

In step 408, the customer invokes his end user device 10 to interact with the mobile application 40 and indicate his desire to speak to a customer service agent. For example, the customer may transmit a request, via the mobile application, to get in touch with a customer service agent. In response, the mobile application sets the customer status as "active available," and transmits the status information to the aggregation module 36 in step 410. The customer state information is then forwarded to one or more agent devices 38 in step 412.

According to one exemplary embodiment of the invention, the request from the customer is received by the multimedia/social media server 24 and forwarded to the routing server 20. According to one example, the routing server 20 generates a task for the customer request and assigns the task to a specific agent. In step 414, an agent assigned to the task views the customer's state as being active available on the mobile phone channel, and accordingly dials a call to the customer's mobile phone number. The agent may also initiate other modes of communication with the mobile phone in addition or in lieu of a voice call (e.g. text messaging).

When a voice connection is made between the user's mobile phone and the calling agent, the mobile application 40 is notified of the connection in step 416. In response, the mobile application sets the customer state as "busy on call," and transmits the state information to the aggregation module 36 in step 418. The customer state information is then forwarded to one or more agent devices 38 in step 420.

In step 422, the call between the customer and the agent terminates, and the mobile application 40 is notified of this fact in step 424. In response, the mobile application sets the customer state as "passive available," and transmits the state information to the aggregation module 36 in step 426. The customer state information is then forwarded to one or more agent devices 38 in step 428.

A person of skill in the art should recognize that embodiments of the present invention may help agents assess customer availability information quickly and reliably for making live contact with the customers. By making live contact with the customers when such customers are detected as being available, agents may be able to clarify issues, gather information, and resolve tasks more efficiently than it would be possible without a live contact.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. For example, although in exemplary embodiments the customer availability information is provided to agents handling offline tasks, a person of skill in the art should recognize that the availability information may also be provided to other types of agents, such as, for example, agents actively responding to customer calls or otherwise engaged in real time communication with the customers. For example, such agents may check whether the customer is present on other media channels (e.g. a website) and suggest interacting with the customer via such other media channels (e.g. pushing video through those channels).

It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A method for establishing contact between a customer contact center agent and an end user, the method comprising:
   monitoring by one or more processors a plurality of communication channels;
   identifying availability of the end user on each of the plurality of communication channels and dynamically adjusting user availability data for each of the plurality of communication channels;
   receiving, by an end user device accessible to the end user, a first message from a contact center device, the first message being received on a first one of the plurality of communication channels for which the end user is identified as being available;
   transmitting a second message, by the end user device, to the contact center device, in response to the first message, the second message being transmitted on the first one of the plurality of communication channels;

in response to the second message, automatically transitioning the user availability data for the first one of the plurality of communication channels from indicating that the end user is available on the first one of the plurality of communication channels, to indicating that communication is blocked on the first one of the plurality of communication channels;

providing the user availability data to a contact center agent; and establishing contact between the contact center agent and the end user via a second one of the plurality of communication channels for which the end user is identified as being available.

2. The method of claim 1, wherein one of the plurality of communication channels is with a mobile phone, and the monitoring includes monitoring an application installed on the mobile phone.

3. The method of claim 2, wherein the application is configured to monitor user actions via the mobile phone and provide the user availability data based on the monitored user actions.

4. The method of claim 1, wherein one of the plurality of communication channels is a telephony channel.

5. The method of claim 4, wherein one of the plurality of communication channels is with a web browser, and the monitoring includes monitoring a website for interactions with the end user.

6. The method of claim 4, wherein one of the plurality of communication channels is with a social media website.

7. The method of claim 4, wherein one of the plurality of communication channels is a chat channel.

8. The method of claim 1, wherein the user availability data indicates that the end user is unavailable for being contacted via a particular one of the communication channels.

9. The method of claim 1 further comprising:
transmitting the first message by the contact center device in response to the user availability data indicating that the end user is passively available for being contacted via the first communication channel.

10. The method of claim 1 further comprising:
transmitting a request to the end user over the second one of the plurality of communication channels, wherein the establishing the contact between the contact center agent device and the end user is based on acceptance of the request by the end user.

11. The method of claim 1 further comprising:
displaying the user availability data in association with an activity to be completed by the contact center agent.

12. The method of claim 1 further comprising:
in response to establishing the contact between the contact center agent and the end user, modifying the user availability data for the second one of the communication channels used to establish the contact.

13. A system for establishing contact between a customer contact center agent and an end user, the system comprising:
one or more processors; and
one or more memory devices coupled to the one or more processors and storing computer instructions therein, the one or more processors being configured to execute at least a portion of the program instructions, the program instructions comprising:
monitoring a plurality of communication channels;
identifying availability of the end user on each of the plurality of communication channels and dynamically adjusting user availability data for each of the plurality of communication channels;
receiving a first message from a contact center device, the first message being received on a first one of the plurality of communication channels for which the end user is identified as being available;
transmitting a second message to the contact center device, in response to the first message, the second message being transmitted on the first one of the plurality of communication channels;
in response to the second message, automatically transitioning the user availability data for the first one of the plurality of communication channels from indicating that the end user is available on the first one of the plurality of communication channels, to indicating that communication is blocked on the first one of the plurality of communication channels;
providing the user availability data to a contact center agent; and
establishing contact between the contact center agent and the end user via a second one of the plurality of communication channels for which the end user is identified as being available.

14. The system of claim 13, wherein one of the plurality of communication channels is with a mobile phone, and the monitoring includes monitoring an application installed on the mobile phone.

15. The system of claim 14, wherein the application is configured to monitor user actions via the mobile phone and provide the user availability data based on the monitored user actions.

16. The system of claim 13, wherein one of the plurality of communication channels is a telephony channel.

17. The system of claim 16, wherein one of the plurality of communication channels is with a web browser, and the monitoring includes monitoring a website for interactions with the end user.

18. The system of claim 16, wherein one of the plurality of communication channels is with a social media website.

19. The system of claim 16, wherein one of the plurality of communication channels is a chat channel.

20. The system of claim 13, wherein the program instructions further include:
in response to establishing the contact between the contact center agent and the end user, modifying the user availability data for the second one of the communication channels used to establish the contact.

21. The method of claim 1 further comprising:
receiving from the contact center agent, a first request to contact the end user via the second one of the plurality of communication channels for which the end user is identified as being available;
in response to receiving the first request, identifying a pending task pertaining the end user assigned to a another contact center agent;
reassigning the pending task from the other contact center agent to the first contact center agent; and
establishing the contact between the contact center agent and the end user via the second one of the plurality of communication channels for which the end user is identified as being available, for handling the reassigned pending task.

22. The method of claim 21, wherein the first request identifies a first task, the method further comprising:
receiving, by the one or more processors, from the other contact center agent, a second request to contact the end user on the particular communication channel, wherein the second request identifies the pending task;

determining, by the one or more processors, that the first task has a higher priority than the pending task; and granting, by the one or more processors, the first request based on the determination, wherein the contact established between the contact center agent and the end user is for handling the first task and the reassigned pending task.

\* \* \* \* \*